2,841,502

TAP HOLE AND BESSEMER BOTTOM MIX

Howard F. West and John H. Veale, Joliet, Ill., assignors to The Illinois Clay Products Company, Joliet, Ill., a corporation of Illinois No Drawing. Application January 11, 1956
Serial No. 558,412

1 Claim. (Cl. 106—281)

The invention relates to refractory compositions and more particularly to refractory compositions suitable for closing the tap holes of blast furnaces, open hearth furnaces and for preparing Bessemer bottoms.

The advantages of a water-free refractory composition for plugging tap holes and the like are well known and attempts have been made to produce such compositions. The Werking Patent No. 2,709,659 discloses such a composition containing as a binder anhydrous heat-hardenable "A" stage phenol-aldehyde reaction product. Tap hole mixes and other refractory compositions are customarily made from inexpensive ingredients and the use of synthetic resins, such as a Bakelite type resin, increases the cost all out of proportion to that desired.

A primary object of this invention is to provide a substantially water-free refractory composition as suitable for plugging tap holes as a synthetic resin type of mix but having the advantage over such mixes of being much less expensive and competitive with the ordinary water plasticized tap hole and Bessemer bottom mixes in common usage.

This and other advantages are obtained by mixing comminuted refractory material such as clay, crushed firebrick, silica, coke or coal with thermal asphalt. The composition sets to a hard dense mass on heating to between approximately 500° F. to 1000° F.

Thermal asphalt is herein defined as an oleaginous material obtained by the thermal cracking of heavy oils such as cycle oils and reduced crudes. It contains a high proportion of fused ring aromatics. The liquid thermal asphalt has a characteristic of oxidizing and polymerizing when heated in air to a solid.

The proportion of binder to solid refractory material in the refractory compositions of this invention may vary widely. For ram mixes the thermal asphalt may be present in about 2% to 15% by weight of the mixture but preferably is present in about 6% to 10%. The thermal asphalt may be present in below 2% but 2% is generally about the lowest limit in order to have sufficient thermal asphalt in the composition to render it plastic. At above 15% the composition becomes too fluid for ramming but 20% of thermal asphalt or even higher can be used when the composition is used for casting.

In order to produce hard, dense tap hole closures and Bessemer bottoms the comminuted refractory material is such that substantially all of it will pass through a 4-mesh screen (U. S. standard).

The preferred refractory material is a mixture of substantially equal parts of milled clay (which may contain the small amount of water ordinarily present in clay) and crushed firebrick.

The preferred thermal asphalt is a viscous liquid having the viscosity suitable for use as road oil.

In the following example road oil 160 refers to a specific thermal asphalt obtained by the thermal cracking at 650° F. to 1000° F. in a Holmes-Manley type cracking unit of heavy cycle oils. It has the following characteristics.

Viscosity, Saybolt-Furol at 140° F. _____ 185
Solubility in CCl₄ _____percent__ 99
Flash, Cleveland open cup _____° F__ 225
Heating loss (50 g. 5 hrs., 325° F.) _____percent__ 8
110 residue content _____do____ 50
Ductility of residue _____ 100

A typical tap hole composition is as follows:

50 parts by weight of 6-mesh (U. S. standard screen) clay.
50 parts by weight of 6-mesh (U. S. standard screen) crushed firebrick.
12 parts by weight of thermal asphalt road oil 160.

The above composition was mixed, injected into place to plug the tap hole of a blast furnace. The composition during the operation of the blast furnace set to a hard refractory mass making a suitable plug for the tap hole.

A typical composition for preparing Bessemer bottoms is as follows:

30 parts by weight of 6-mesh (U. S. standard screen) clay.
70 parts by weight of 6-mesh (U. S. standard screen) crushed firebrick.
8 parts by weight thermal asphalt road oil No. 160.

The composition was mixed, rammed into place in the bottom of the Bessemer converter and dried at 900° F. for 30 hours. The composition set to a hard dense mass.

Obviously the invention is not limited to the details of the illustrative product and its method of manufacture, since these may be variously modified. Moreover, it is not indispensable that all features of the invention be used conjointly since various features may be used to advantage in different combinations and sub-combinations.

Having described out invention what we claim as new and desire to secure by Letters Patent is:

A plastic refractory composition suitable for closing tap holes, forming Bessemer bottoms and the like, said composition consisting essentially of a mixture of comminuted clay and crushed firebrick, and a liquid binder present in the amount from about 6% to 10% by weight, said liquid binder being an oleaginous material containing fused ring aromatics obtained by the thermal cracking of cycle oils at temperatures of between approximately 650° F. to 1000° F., and further characterized by oxidizing and polymerizing on heating to a solid.

References Cited in the file of this patent

UNITED STATES PATENTS

| | | |
|---|---|---|
| 932,622 | Lynch et al. | Aug. 31, 1909 |
| 1,091,567 | Eldred | Mar. 31, 1914 |
| 2,037,147 | Radcliffe | Apr. 14, 1936 |
| 2,277,842 | Bray | Mar. 31, 1942 |
| 2,423,424 | Hall et al. | July 1, 1947 |

OTHER REFERENCES

Abraham: "Asphalts and Allied Substances," vol. I., fifth edition (1945), pages 77–78 (note Table IV).